(12) United States Patent
Tanaka et al.

(10) Patent No.: US 7,255,606 B2
(45) Date of Patent: Aug. 14, 2007

(54) MEMORY CARD ADAPTOR

(75) Inventors: Akihiro Tanaka, Osaka (JP); Yasuo Nakai, Osaka (JP)

(73) Assignee: Hosiden Corporation, Yao-shi, Osaka (JP)

( * ) Notice: Subject to any disclaimer, the term of this patent is extended or adjusted under 35 U.S.C. 154(b) by 0 days.

(21) Appl. No.: 11/495,722

(22) Filed: Jul. 31, 2006

(65) Prior Publication Data

US 2007/0032135 A1 Feb. 8, 2007

(30) Foreign Application Priority Data

Aug. 4, 2005 (JP) ............................. 2005-226793

(51) Int. Cl.
*H01R 24/00* (2006.01)
(52) U.S. Cl. ...................... 439/630; 439/945
(58) Field of Classification Search ............... 439/630, 439/607, 945
See application file for complete search history.

(56) References Cited

U.S. PATENT DOCUMENTS 7,094,106 B2 * 8/2006 Yamamoto et al. ......... 439/630

FOREIGN PATENT DOCUMENTS

JP  2004-272704  9/2004
JP  3110839  5/2005

* cited by examiner

*Primary Examiner*—Javaid H. Nasri
(74) *Attorney, Agent, or Firm*—Bacon & Thomas, PLLC

(57) ABSTRACT

A memory card adaptor which enables a small memory card to be used in a card connector for a large memory card that is larger than the small memory card. A connecting terminal which is elastically displaceable is formed integrally on a conductive (metal-made) cover that is one component of an adaptor body. The connecting terminal is contacted with plural grounding contacts, and electrical connection is established between the grounding contacts, and between the grounding contacts and the cover. High contact reliability is ensured, and an electrostatic breakdown preventing function is surely maintained.

3 Claims, 10 Drawing Sheets

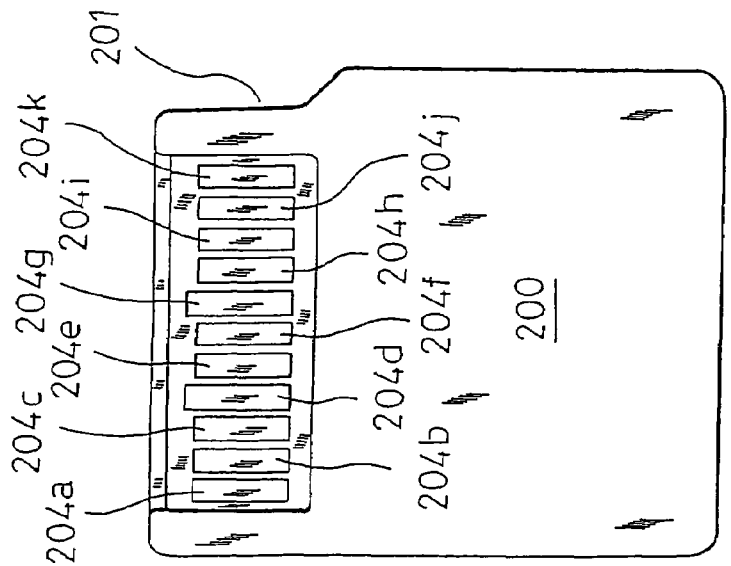
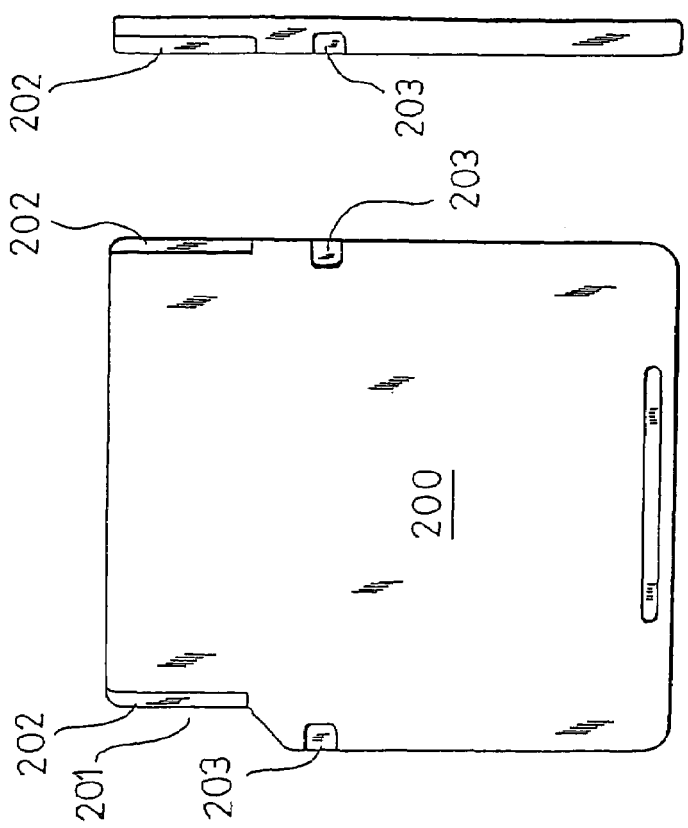

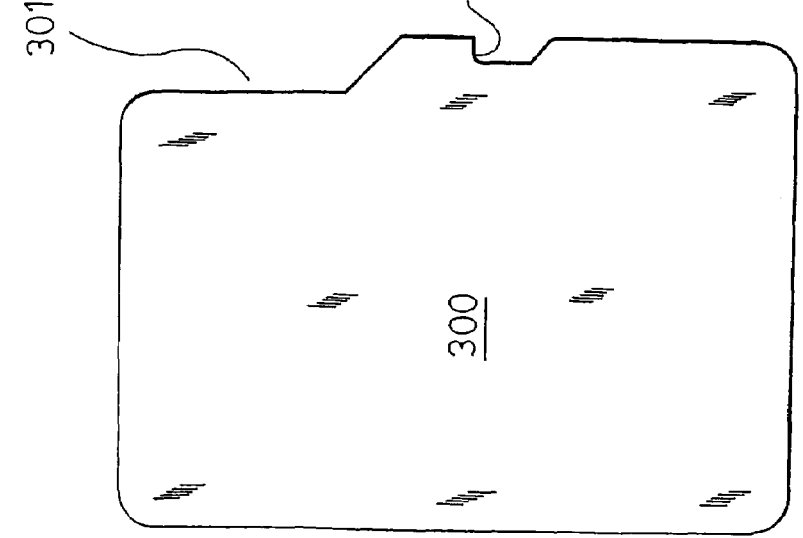
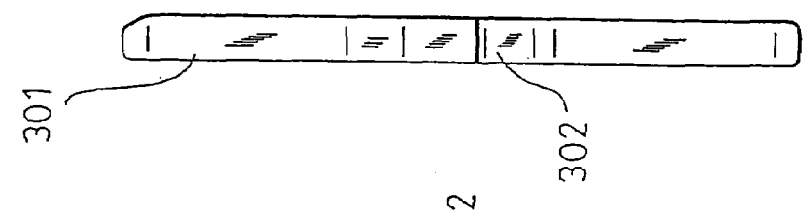
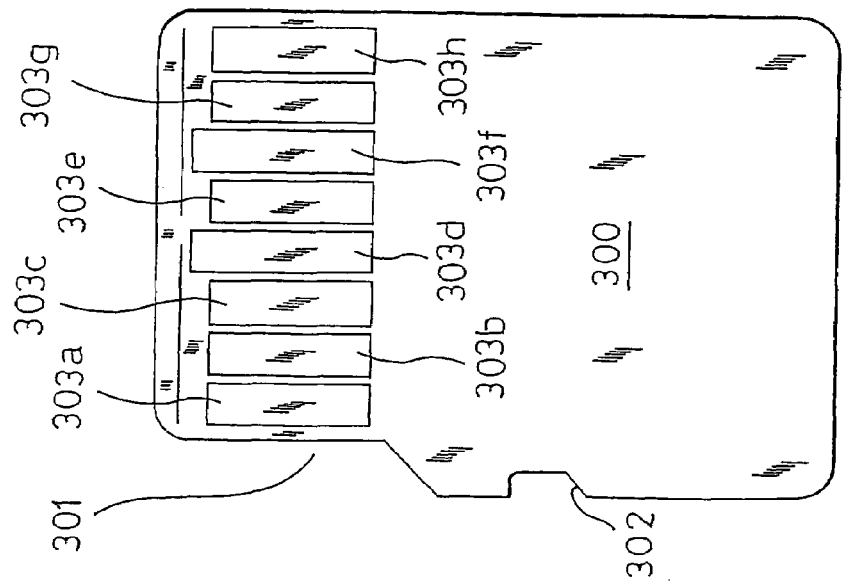

MEMORY CARD ADAPTOR

BACKGROUND OF THE INVENTION

1. Filed of the Invention

The present invention relates to a memory card adaptor which enables a small memory card to be used in a card connector for a large memory card that is larger than the small memory card.

2. Description of the Prior Art

Conventionally, as a downsized version of an SD card (24×32×2.1 mm: length×width×thickness), a mini SD card (20×21.5×1.4 mm: length×width×thickness) 200 such as shown in FIGS. 9A, 9B, and 9C has been provided.

As shown in FIGS. 9A, 9B, and 9C, in the rear face side of an end portion of the front side of the mini SD card 200 in the case where the mini SD card is inserted in the normal insertion posture (hereinafter, the front side in this case is referred to as "rear side"), eleven contacts 204a to 204k are juxtaposed in a direction (hereinafter, referred to as "lateral direction") which is perpendicular to the longitudinal direction and the thickness direction. In the rear side of the mini SD card 200, a cut-away portion 201 is formed by cutting away one edge. A step portion 202 which is upward directed is formed in each of the right and left side edges of the surface side of the rear end portion of the mini SD card 200 in which the width is narrowed by the cut-away portion 201. The cut-away portion 201 cooperates with the step portions 202 to prevent erroneous insertion of the mini SD card 200 into a card connector in a posture other the normal insertion posture (insertion in a posture where the front and rear relationship and the front and back relationship are inverted) from occurring. A locking cut-away 203 is disposed in each of the right and left sides of the surface of the mini SD card 200 in a wider portion which is in front of the step portions 202, so that, when the mini SD card 200 is attached to the card connector, locking members of the card connector are engaged with the locking cut-aways 203, thereby preventing the mini SD card 200 from dropping off. In the eleven contacts 204a to 204k of the mini SD card 200, the first to eleventh contacts 204a to 204k are sequentially arranged in a direction from left to right as seen from the side of the rear face, four or the first, second, tenth, and eleventh contacts 204a, 204b, 204j, 204k are used for data, the third contact 204c is used for a command, two or the fourth and ninth contacts 204d, 204i are used for grounding, the seventh contact 204g is used for power supply, and the eighth contact 204h is used for a clock signal. The two or the fifth and sixth contacts 204e, 204f are preliminarily added to the mini SD card 200. The effective contacts are nine so as to correspond to the nine contacts of the SD card.

Recently, as a memory card which is smaller than the mini SD card 200, a TransFlash card, and a micro SD card (11×15×1 mm: length×width×thickness) 300 such as shown in FIGS. 10A, 10B, and 10C in which the TransFlash specification is adopted have been provided.

As shown in FIGS. 10A, 10B, and 10C, in the rear side of the micro SD card 300, a cut-away portion 301 is formed by cutting away one edge. A locking cut-away 302 is disposed in one side portion of the micro SD card 300 on the side of the cut-away portion 301 and in a wider portion which is in front of the cut-away portion 301. In the rear face side of an end portion of the rear side of the micro SD card 300, eight contacts 303a to 303h are juxtaposed in the lateral direction. In the eight contacts 303a to 303h of the micro SD card 300, the first to eighth contacts 303a to 303h are sequentially arranged in a direction from left to right as seen from the side of the rear face, four or the first, second, seventh, and eighth contacts 303a, 303b, 303g, 303h are used for data, the third contact 303c is used for a command, the fourth contact 303d is used for power supply, the fifth contact 303e is used for a clock signal, and the sixth contact 303f is used for grounding. In the micro SD card 300, namely, the grounding contact is reduced to one, and the number of contacts is reduced to eight as compared with the case where an SD card and the mini SD card 200 have the nine contacts (in the mini SD card 200, the number of effective contacts).

As described above, as compared with the mini SD card 200 in the conventional art, the micro SD card 300 is slightly smaller in outer dimensions, and has the fewer number of contacts. In order to use the micro SD card in a conventional card connector for a mini SD card, therefore, a memory card adaptor for this purpose is required. A memory card adaptor of this kind is disclosed by, for example, Japanese Utility Model Registration No. 3,110,839.

The conventional memory card adaptor which enables a micro SD card to be used in a card connector for a mini SD card is configured in the following manner. The adaptor comprises a mini-SD card type adaptor body which is formed so as to have outer dimensions corresponding to the mini SD card specification, and to which a micro SD card is to be attached. In the adaptor body, eleven stationary terminals which are to be electrically connected to eleven contacts of the card connector, and eight movable terminals which are to be electrically connected to the eight contacts of the micro SD card are separately disposed. The eight movable terminals are electrically connected to the corresponding eight stationary terminals via a circuit board disposed in the adaptor body, respectively, and the two grounding stationary terminals are electrically connected to each other.

As described above, the conventional memory card adaptor incorporates the circuit board, and includes the two kinds of terminals, or the terminals which are to be connected to a card connector for a large memory card, and those which are to be connected to a small memory card. Therefore, the conventional memory card adaptor has problems in that the number of the components is large, that the structure is complicated, and that the production cost is high. In the adaptor body, the circuit board exists over the range from the front end to the rear end. Consequently, metal components cannot be used in the adaptor body, and there arises a further problem in that it is impossible to take a countermeasure against electrostatic breakdown.

A technique in which, in a memory card adaptor, one of components of an adaptor body is made of a metal, and the metal component is electrically connected to plural grounding contacts incorporated in the adaptor body to take a countermeasure against electrostatic breakdown is disclosed by, for example, Japanese Patent Application Laying-Open No. 2004-272704. When this conventional well-known technique is employed, it is not required to, as in the conventional memory card adaptor, incorporate a circuit board, and separately dispose two kinds of terminals, or terminals which are to be connected to a card connector for a large memory card, and those which are to be connected to a small memory card. Therefore, the number of components is small, the structure is simplified, and the production cost can be reduced.

SUMMARY OF THE INVENTION

The problem to be solved by the invention is as follows. In a conventional memory card adaptor having a function of preventing electrostatic breakdown, an adaptor body is configured by: a resin-made base; a resin-made cover in which an opening is partly formed, and which covers the base; and a metal shell (metal component) which is attached to the opening of the cover. Therefore, a connecting terminal which is formed integrally on the metal shell in order to electrically connect the metal shell to plural grounding contacts is thinly protruded within the width of the grounding contacts in a range from the metal shell to the grounding contacts along the inner face of the cover so as not to be contacted with a contact other than the grounding contacts, and sandwiched between the grounding contacts and the cover, whereby the terminal is contacted with the grounding contacts. However, there is a possibility that the contacts between the connecting terminal and the grounding contacts may be lost by a dimensional error of components of the adaptor or in assembly, or deformation due to an external force or heat which is applied to the adaptor during use. When this situation occurs, the electrostatic breakdown preventing function of the adaptor is lost.

In order to solve the problem, the invention provides a memory card adaptor which enables a small memory card to be used in a card connector for a large memory card that is larger than the small memory card, wherein the adaptor comprises a large memory card type adaptor body which is formed into outer dimensions corresponding to a specification for the large memory card, and to which a small memory card incorporating plural contacts is to be attached, a connecting terminal which is elastically displaceable is formed integrally on a conductive cover that cooperates with an insulative base to constitute the adaptor body, the connecting terminal is contacted with plural grounding contacts to electrically connect the grounding contacts together, and the grounding contacts with the cover, whereby grounding contacts which may be a floating ground are eliminated from the adaptor, and the adaptor is provided with the electrostatic breakdown preventing function. Even when a dimensional error of components of the adaptor or in assembly, or deformation due to an external force or heat which is applied to the adaptor during use occurs, the connecting terminal self-holds the contact with the grounding contacts while absorbing the error or deformation, and high contact reliability is ensured. Therefore, the electrostatic breakdown preventing function of the adaptor is surely maintained.

BRIEF DESCRIPTION OF THE DRAWINGS

FIG. 9A is a front face view of a known mini SD card, FIG. 9B is a side view of the known mini SD card, and FIG. 9O is a rear face view of the known mini SD card; and FIG. 10A is a front face view of a known micro SD card, FIG. 10B is a side view of the known micro SD care, and FIG. 10C is a rear face view of the known micro SD card.

DETAILED DESCRIPTION OF THE PREFERRED EMBODIMENT

Figure 1:
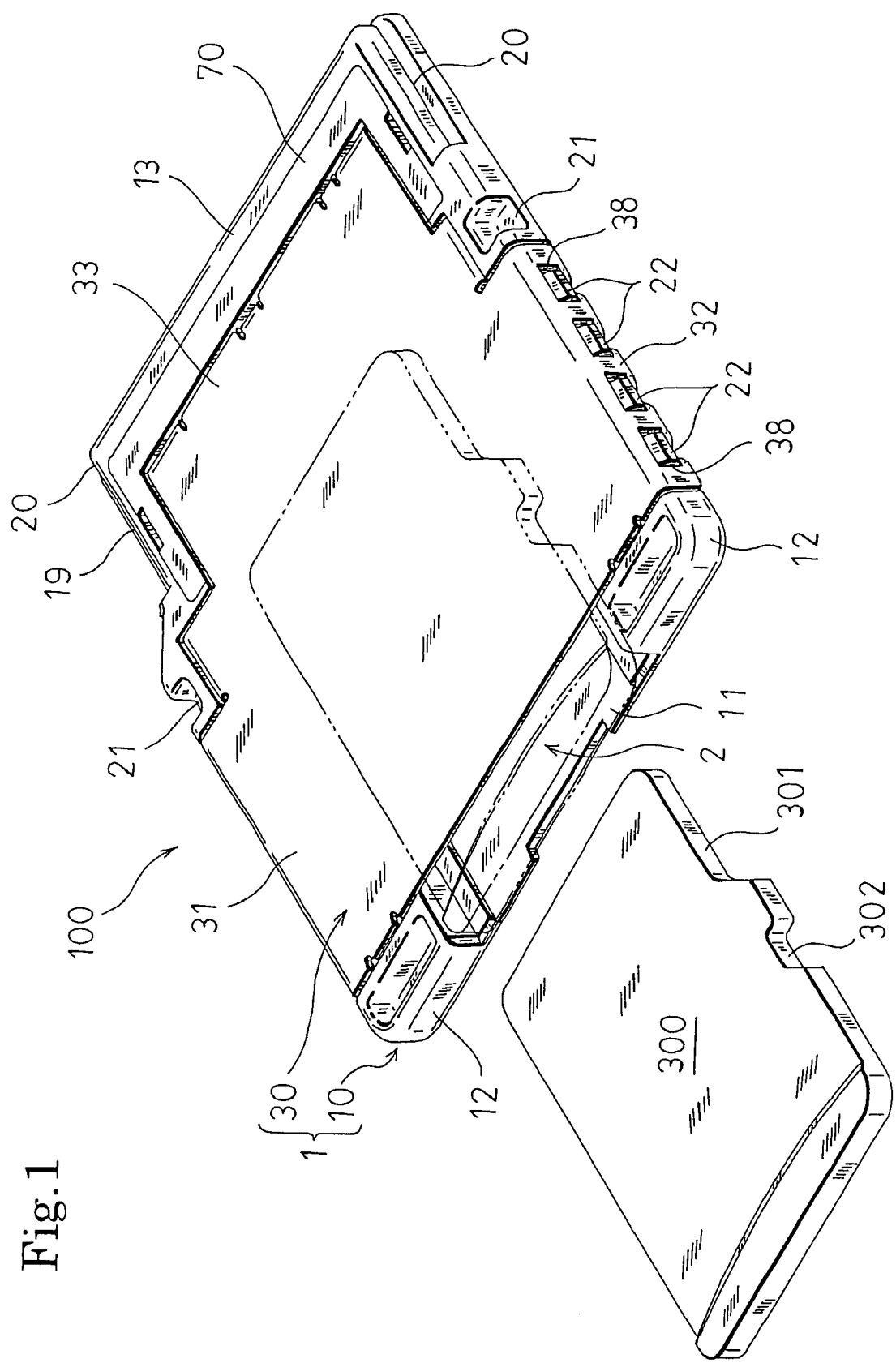
FIG. 1 is an external view of a memory card adaptor of an embodiment, as viewed from the front face side.

Hereinafter, an embodiment of the memory card adaptor of the invention will be described with reference to FIGS. 1 to 8. A memory card adaptor 100 of the embodiment is used so that the micro SD card 300 which is a small memory card is attached to the adaptor, and the micro SD card is enabled to be used in a card connector for the mini SD card 200 which is a card connector for a larger memory card. The memory card adaptor is configured by: a mini SD card type adaptor body 1 which is shown in FIGS. 1 and 2, which is formed into outer dimensions (the dimensions of the length, the width, and the thickness) that are substantially identical with those of the mini SD card 200, in order to cope with the mini SD card specification, and to which the micro SD card 300 is to be attached; a contact set 50 which is shown in FIGS. 3 and 4, and FIGS. 7A and 7B, and which is incorporated in the adaptor body 1; and a locking member 90 which is shown in FIGS. 3 and 4.

Figure 2:
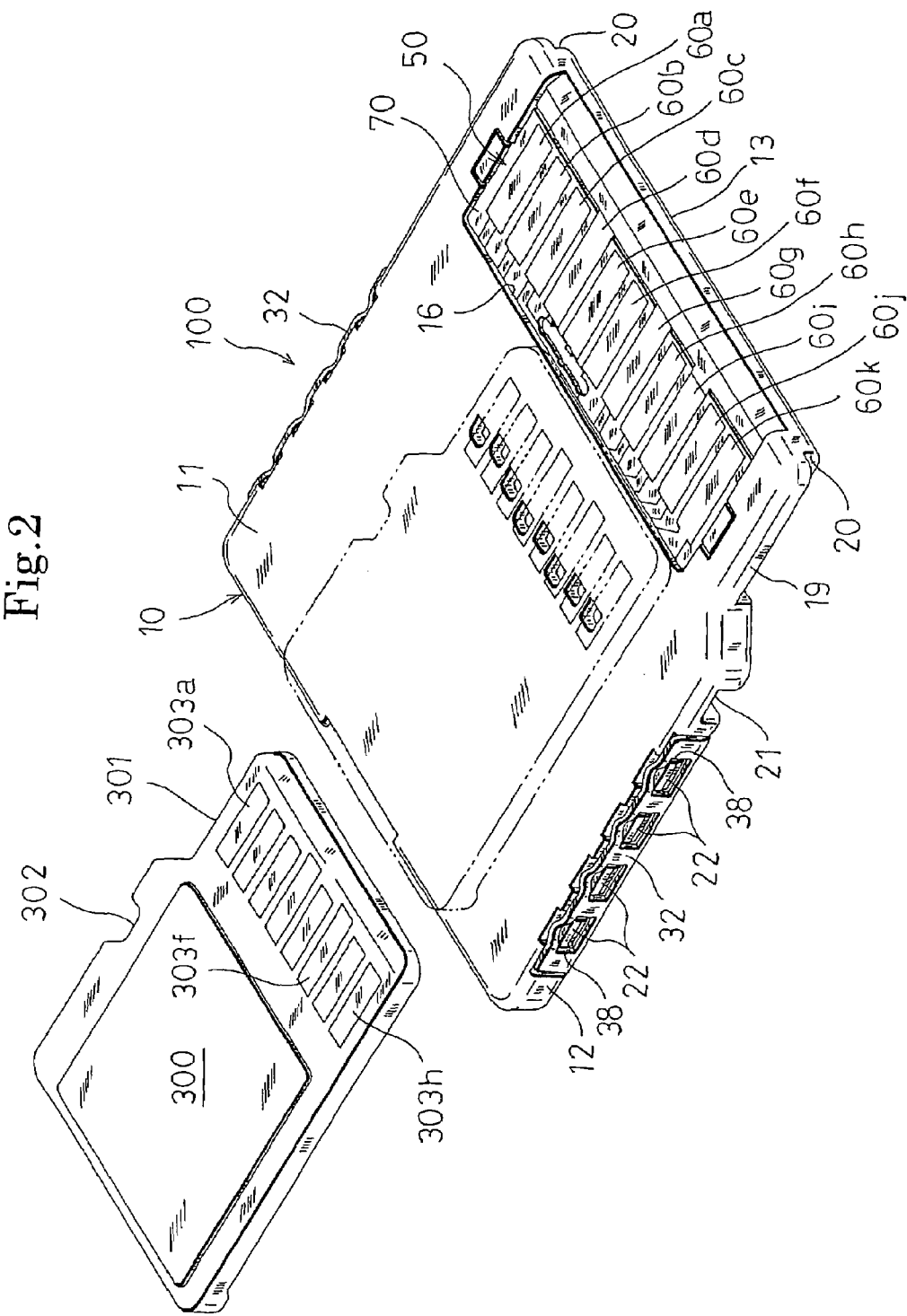
FIG. 2 is an external view of the adaptor as viewed from the rear face side.
Figure 3:
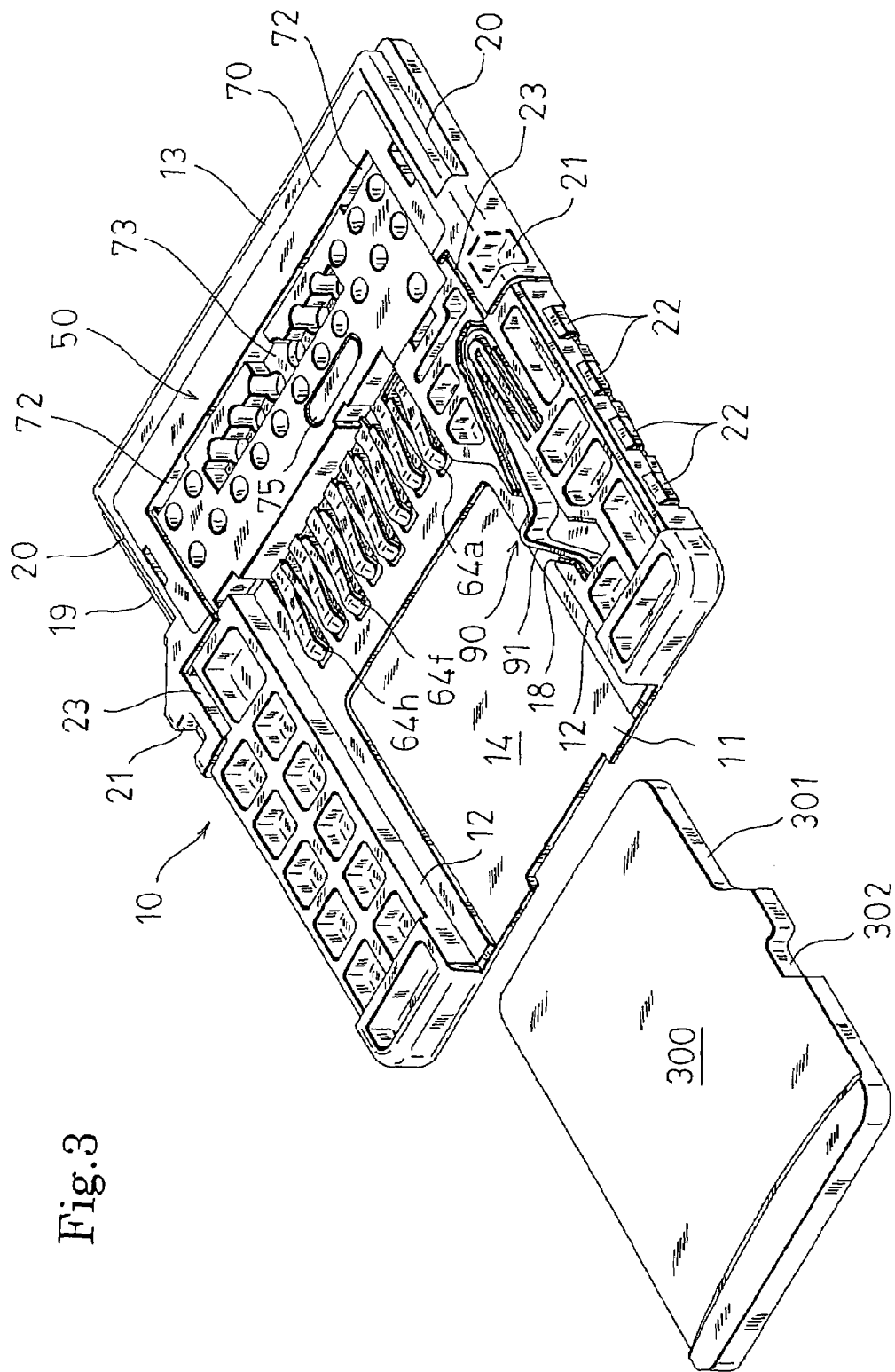
FIG. 3 is an external view of the adaptor in a state where a metal cover is detached, as viewed from the front face side.
Figure 4:
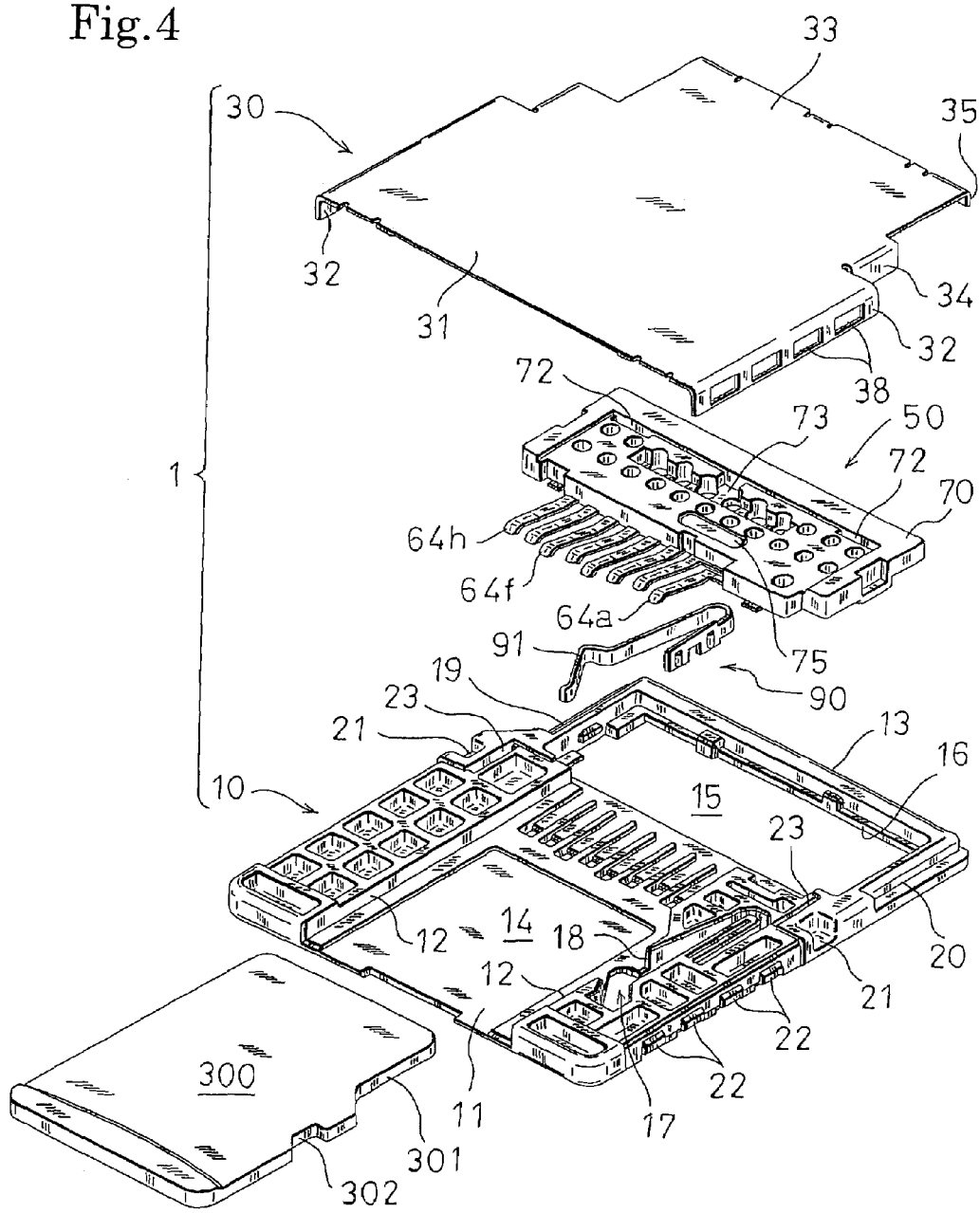
FIG. 4 is a structural diagram of the adaptor in a disassembled state.
Figure 5A:
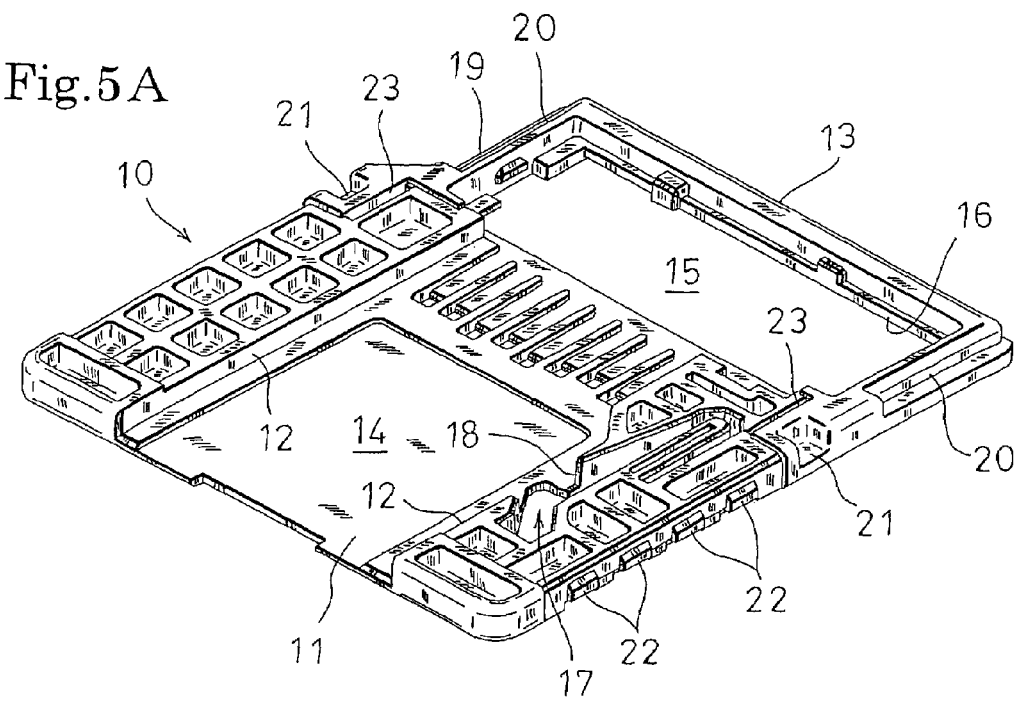
FIG. 5A is an external view of a base as viewed from the front face side.
Figure 5B:
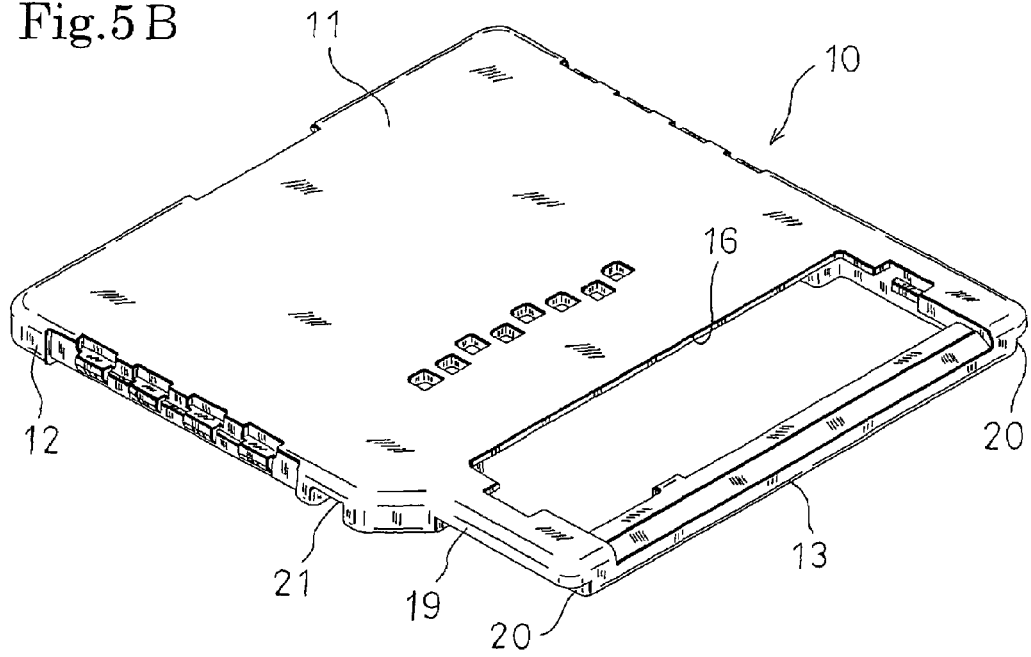
FIG. 5B is an external view of the base as viewed from the rear face side.
Figure 6A:
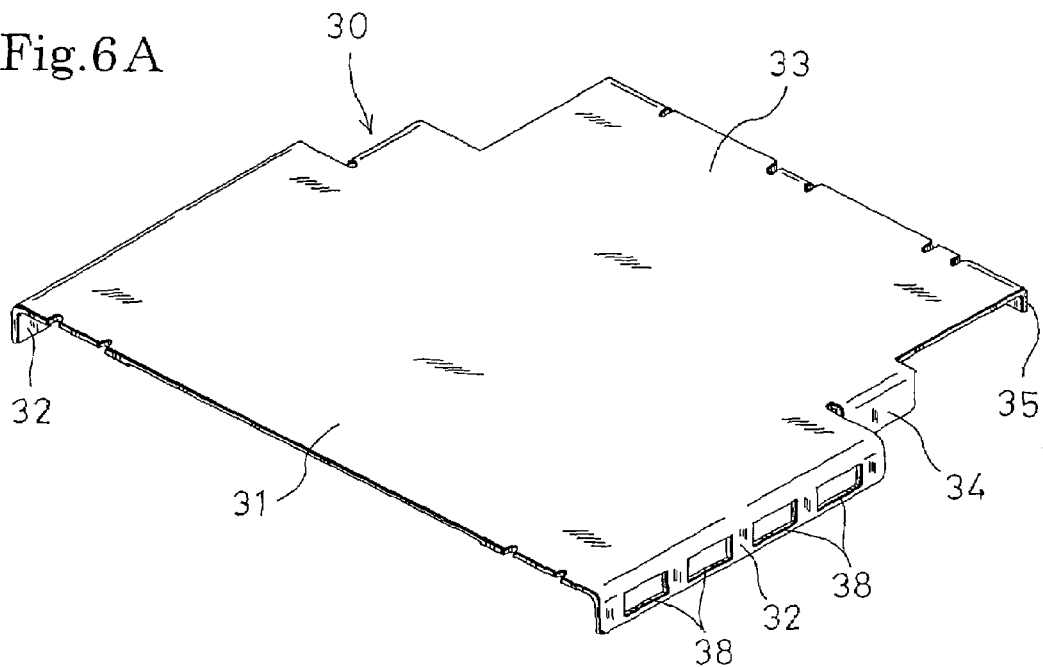
FIG. 6A is an external view of the cover as viewed from the front face side.
Figure 6B:
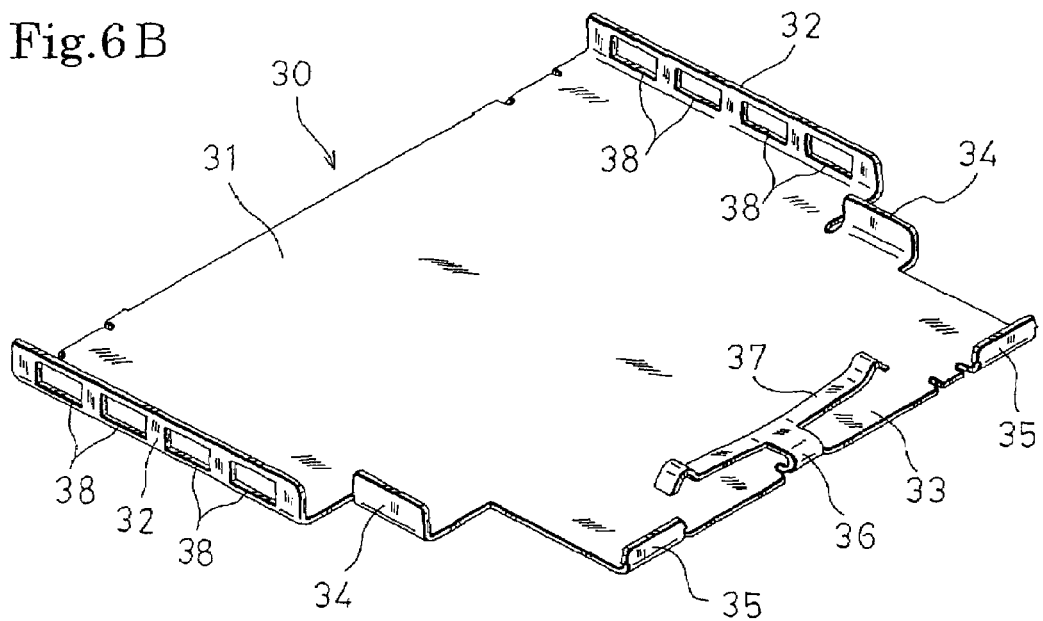
FIG. 6B is an external view of the cover as viewed from the rear face side.

The adaptor body 1 shown in FIGS. 1 and 2 is configured by two components, i.e., an insulative base 10 which is shown in FIGS. 3, 4, 5A, and 5B, and which is made of a synthetic resin material, and a conductive cover 30 which is shown in FIGS. 4, 6A, and 6B, and which is formed by a metal plate.

The base 10 shown in FIGS. 3, 4, 5A, and 5B integrally has: a bottom plate 11 which is substantially rectangular, and in which one rear edge is cut away; reinforcing ribs 12 which upstand lengthwise and widthwise in right and left side areas of the front wide portion of the bottom plate 11 in which the width is not narrowed by the cut-away portion; and a side wall 13 which upstands along the peripheral edge of the rear side of the bottom plate 11 in which the width is narrowed by the cut-away portion. A card housing space 14 which is to house the micro SD card 300 is formed between the reinforcing ribs 12, and an insulator housing space 15 for a contact set 50 is formed continuously with the rear side of the card housing space 14. A large contact exposing window 16 is opened in the bottom face of the insulator housing space 15. A locking member housing space 17 is formed in adjacent to one side of the card housing space 14 to communicate with the card housing space 14 through a communication port 18.

In the base 10, disposed are a cut-away portion 19, step portions 20, and locking cut-aways 21 for the adaptor 100 which correspond to the cut-away portion 201, the step portions 202, and the locking cut-aways 203 of the mini SD card 200, respectively. Plural cover engagement hooks 22 are disposed on the right and left outer side faces of the wide portion of the base 10, and cover engagement grooves 23 are disposed in right and left inner side portions of the wide portion of the base 10.

In the cover 30 shown in FIGS. 4, 6A, and 6B, integrally formed are: a rectangular main portion 31 which covers the upper face of the front wide portion of the base 10; first elongated portions 32 which hang from the right and left side edges of the main portion 31 to cover the right and left outer side faces of the front wide portion of the base 10; a second elongated portion 33 which is rearward elongated flushly from the rear edge of the main portion 31 to cover the upper face of the insulator housing space 15 of the base 10, and which is narrower than the main portion 31; first engagement hooks 34 which are downward elongated from the right and left side edges of a basal part of the second elongated portion 33; second engagement hooks 35 which are downward elongated from the right and left side portions of the tip end side edge of the second elongated portion 33; a folded piece 36 which is elongated in a U-like shape from a substantially middle portion of the tip end side edge of the second elongated portion 33, and in which an end portion is opposed to the inner face of the second elongated portion 33; and a connecting terminal 37 which is elastically displaceable, and which is a plate spring that is elongated in the lateral direction (the juxtaposition direction of the contacts) on the side of the inner face of the second elongated portion 33 while an intermediate portion is continuous to the end portion of the folded piece 36. Plural base engagement holes 38 are disposed in the first elongated portions 32.

The contact set 50 shown in FIGS. 3 and 4, and FIGS. 7A and 7B is configured by: eleven contacts 60a to 60k which are equal in number to the mini SD card 200 so as to cope with the mini SD card specification; and an insulative insulator 70 which is made of a synthetic resin material, and on which the eleven contacts 60a to 60k are laterally juxtaposed in the insulating state to be integrally held.

Figure 7A:
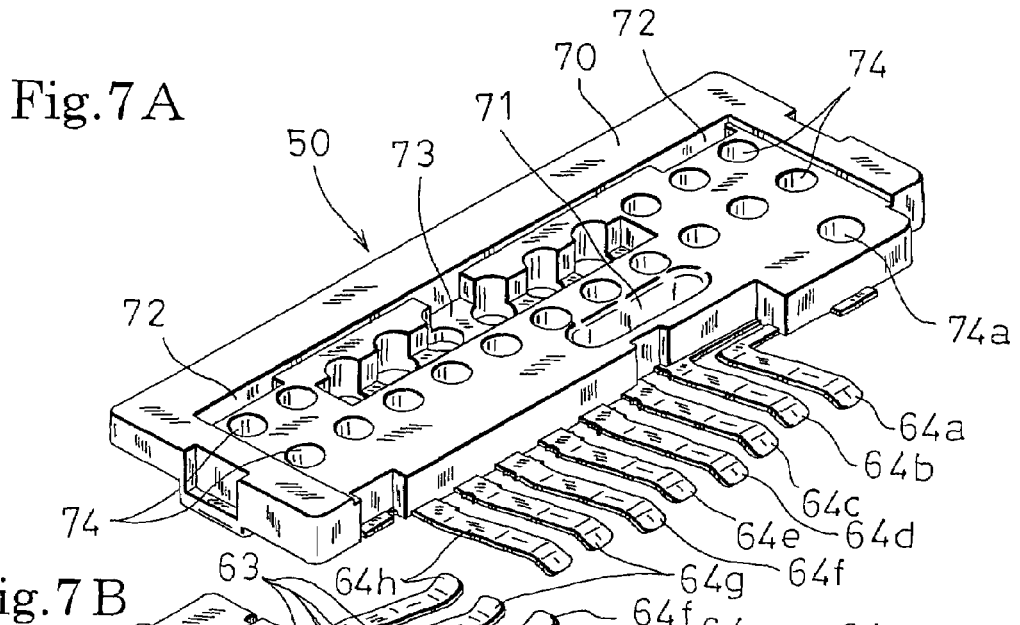
FIG. 7A is an external view of a contact set as viewed from the front face side.
Figure 7B:
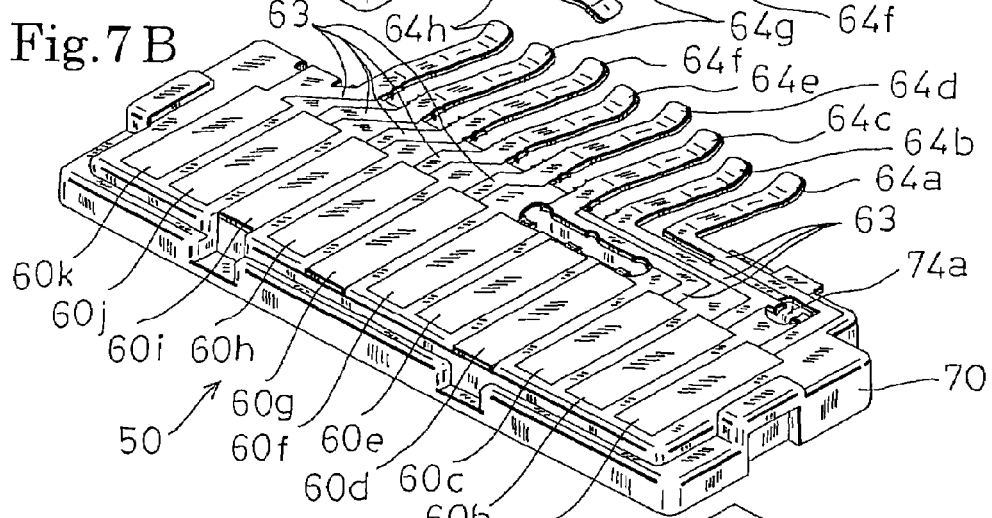
FIG. 7B is an external view of the contact set as viewed from the rear face side.
Figure 7C:
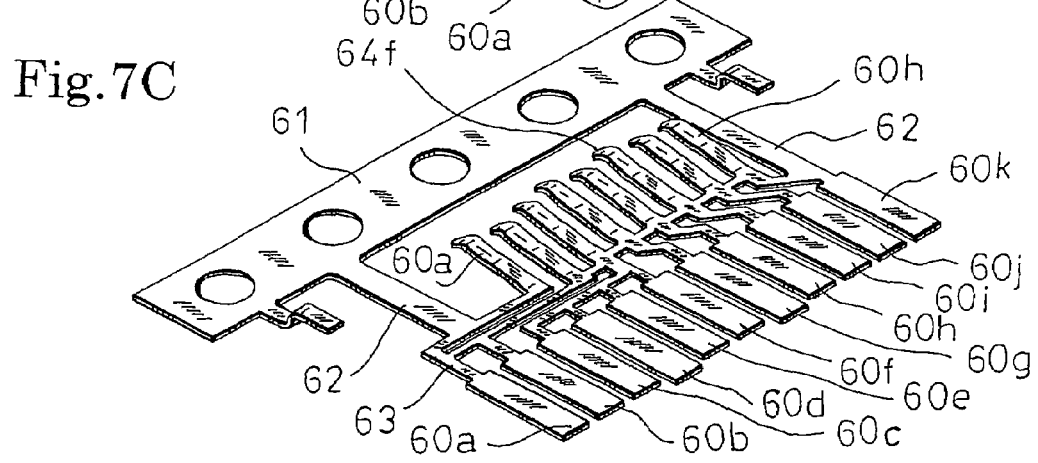
FIG. 7C is an external view of contacts before insert molding, as viewed from the front face side.

As shown in FIG. 7C, the eleven contacts 60a to 60k are shaped by punching a conductive thin plate of a metal, in a state where the contacts are continuous to a carrier 61 via connecting pieces 62. Then, the insulator 70 is formed by insert molding on the eleven contacts 60a to 60k in this state, and thereafter the connecting pieces 62 are cut off to be separated together with the carrier 61, whereby an intermediate assembly of the contact set 50 is configured.

Each of the eleven contacts 60a to 60k is formed into a rectangular plate-like shape. Eight contact spring pieces 64a to 64h which are equal in number to the micro SD card 300 so as to cope with the micro SD card specification are elongated in a cantilevered manner from the front ends of the contacts 60a to 60k via connecting portions 63 that are mutually coupled. In the eleven contacts 60a to 60k, the first to eleventh contacts 60a to 60k are sequentially arranged in a direction from left to right as seen from the side of the rear face, four or the first, second, tenth, and eleventh contacts 60a, 60b, 60j, 60k are used for data, the third contact 60c is used for a command, two or the fourth and ninth contacts 60d, 60i are used for grounding, two or the fifth and sixth contacts 60e, 60f are for reserve, the seventh contact 60g is used for power supply, and the eighth contact 60h is used for a clock signal. Namely, the arrangement of the contacts is identical with that of the contacts 204a to 204k of the mini SD card 200. By contrast, in the eight contact spring pieces 64a to 64h, the first to eighth contact spring pieces 64a to 64h are sequentially arranged in a direction from left to right as seen from the side of the rear face, four or the first, second, seventh, and eighth contact spring pieces 64a, 64b, 64g, 64h are used for data, the third contact spring piece 64c is used for a command, the fourth contact spring piece 64d is used for power supply, the fifth contact spring piece 64e is used for a clock signal, and the sixth contact spring piece 64f is used for grounding. Namely, the arrangement of the contact spring pieces is identical with that of the contacts 303a to 303h of the micro SD card 300.

Figure 8:
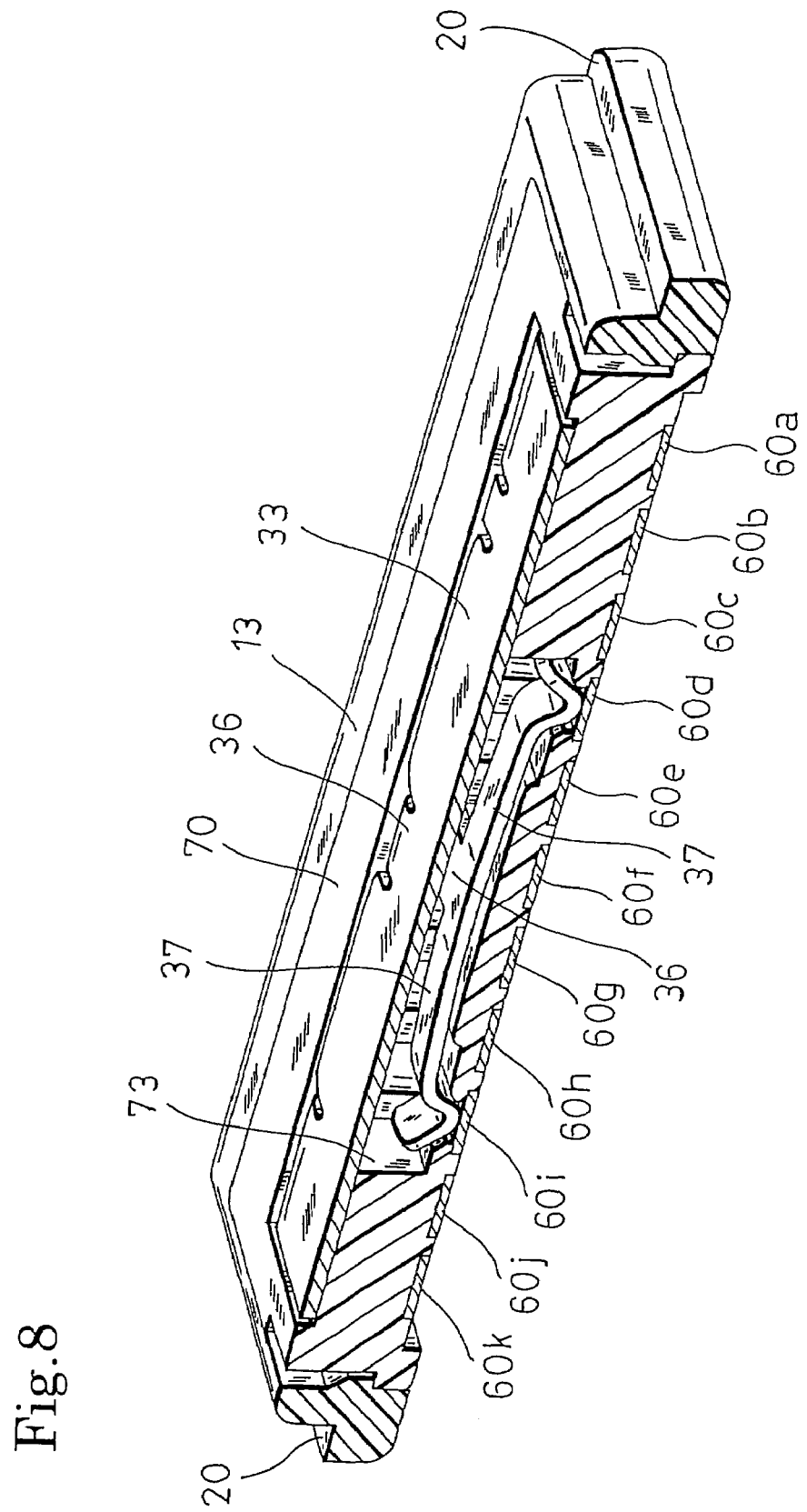
FIG. 8 is a section view showing electrical connecting structures between grounding contacts, and between the grounding contacts and the cover.

In the intermediate assembly, the insulator 70 is formed into a rectangular plate-like shape which is to be fitted into the insulator housing space 15 of the base 10. In the lower face of the insulator 70, the connecting portions 63 and the contacts 60a to 60k are laterally arranged and flushly embedded, and the eight contact spring pieces 64a to 64h are inclinedly protruded in a forward upward sloping manner in the front side of the insulator 70. In the insulator 70, formed are: tool insertion holes 71, 74a for extracting predetermined areas of the connecting portions 63 embedded in the lower face of the insulator; cover engagement grooves 72 into which the second engagement hooks 35 of the cover 30 are to be pressingly inserted; a housing hole 73 which houses the folded piece 36 and connecting terminal 37 of the cover 30, and which, as shown in FIG. 8, causes one end of the connecting terminal 37 to contact with the fourth grounding contact 60d from the upper side, and the other end to contact with the ninth grounding contact 60i from the upper side; and plural lightening holes 74 for reducing the weight. One of the lightening holes or 74a functions also as a tool insertion hole.

After the intermediate assembly is configured, the predetermined areas of the connecting portions 63 embedded in the lower face of the insulator 70 are extracted through the tool insertion holes 71, 74a, and at the same time also the mutually coupling portions of the connecting portions 63 outside the insulator 70 are extracted, thereby configuring the contact set 50 shown in FIGS. 3 and 4, and FIGS. 7A and 7B. In the contact set 50, the eight contact spring pieces 64a to 64h is continuously integrated with the corresponding eight contacts 60a to 60c, 60g to 60k via the eight thin connecting portions 63 which are independently separated from one another. The remaining three or fourth grounding contact 60d, and two or fifth and sixth reserve contacts 60e, 60f are separated from the connecting portions 63. In the same manner as the mini SD card 200, the rear ends of the fourth grounding contact 60d and the seventh power supply contact 60g are protruded or deviated in the rearward direction (the adaptor insertion direction) as compared with the other nine contacts 60a to 60c, 60e, 60f, 60h to 60k, so as to contact with contacts of the card connector in advance of the other nine contacts 60a to 60c, 60e, 60f, 60h to 60k. Accordingly, there is a step difference (a difference in protrusion) between the positions of the rear ends of the two or fourth and ninth grounding contacts 60d, 60i (see FIG. 2 and FIG. 7B). A resin-made plug 75 is pressingly inserted and embedded into the tool insertion hole 71 of the contact set 50 (see FIGS. 3 and 4).

The locking member 90 shown in FIGS. 3 and 4 is formed by a plate spring of a thin metal plate, and has a card engagement portion 91 on the free end side. Alternatively, the locking member 90 may be formed integrally with the base 10 by a resin.

The memory card adaptor 100 of the embodiment is assembled in the following manner. The insulator 70 of the contact set 50 is fitted into the insulator housing space 15 of the base 10. The eleven contacts 60a to 60k of the contact set 50 are exposed from the rear face of the base 10 through the contact exposing window 16 of the base 10, and the eight contact spring pieces 64a to 64h of the contact set 50 are protruded into a rear portion of the card housing space 14 of the base 10. Namely, the contact set 50 is incorporated into the base 10, the locking member 90 is incorporated into the locking member housing space 17 of the base 10, the rear side of the locking member 90 is fixed to the base 10, and the card engagement portion 91 on the free end side (front side) of the locking member 90 is protruded into the card housing space 14 through the communication port 18 (the state shown in FIG. 3). Then, the first engagement hooks 34 of the cover 30 are inserted into the cover engagement grooves 23 of the base 10, and the second engagement hooks 35 of the cover 30 are inserted into the cover engagement grooves 72 of the insulator 70. While fitting the folded piece 36 and the connecting terminal 37 of the cover 30 into the housing hole 73 of the insulator 70, the cover 30 covers the base 10 from the upper side so that the upper faces of the reinforcing ribs 12, the card housing space 14, and the locking member housing space 17 into which the locking member 90 is incorporated, in the front wide portion of the base 10 are integrally covered with the main portion 31 of the cover 30. The second elongated portion 33 of the cover 30 is joined to the upper face of the insulator 70 which is fitted into the insulator housing space 15 of the base 10, and the insulator 70 is sandwiched between the bottom plate 11 of the base 10 and the second elongated portion 33 of the cover 30. The right and left outer side faces of the front wide portion of the base 10 are covered with the first elongated portions 32 of the cover 30, and the cover engagement hooks 22 of the base 10 are fitted into the base engagement holes 38 of the cover 30. Finally, the lower edges of the base engagement holes 38 of the first elongated portions 32 of the cover 30 are inward caulked to fix the cover 30 to the base 10 in the covered state, thereby completing the assembly. Alternatively, the base 10 and the insulator 70 may be joined to each other by a method such as welding by means of heat, an ultrasonic wave, or the like, or adhesion.

In the assembly-completed state, as shown in FIGS. 1 and 2, the adaptor has the outer dimensions (the dimensions of the length, the width, and the thickness) which are substantially identical with those of the mini SD card 200 corresponding to the mini SD card specification. In the same manner as the mini SD card 200, the eleven contacts 60a to 60k are exposed from the rear face of the rear end portion with being laterally juxtaposed, the cut-away portion 19 is formed by cutting away one rear edge, the upward step portions 20 are disposed in the right and left side edges of the surface of the rear end portion in which the width is narrowed by the cut-away portion 19, and the locking cut-aways 21 are disposed on the right and left sides of the surface of the wide portion which is on the forward side with respect to the cut-away portion 19. Therefore, the adaptor can be attached to a card connector for the mini SD card 200.

A card insertion port 2 is opened in the front face, the card housing space 14 communicates with the card insertion port 2, and the eight contact spring pieces 64a to 64h are laterally juxtaposed in the rear portion (inner portion) of the card housing space 14. Therefore, the micro SD card 300 can be attached to the card housing space 14 through the card insertion port 2, and the free end portions of the eight contact spring pieces 64a to 64h can be contacted with the eight contacts 303a to 303h of the attached micro SD card 300.

A substantially whole of the surface and the front halves of the right and left side faces are configured by a metal face, and the other faces or the rear face and the other side faces are configured by a resin face. As shown FIG. 8, the connecting terminal 37 which is formed integrally with the cover 30 constituting the metal face is placed together with the folded piece 36 inside the housing hole 73 formed in the incorporated insulator 70, and, by the elasticity of the terminal itself from the upper side, one end is pressed against and contacted with the fourth grounding contact 60d, and the other end is pressed against and contacted with the other or ninth grounding contact 60i. As a result of the contacts, electrical connection is established between the two grounding contacts 60d, 60i which are in the eleven contacts 60a to 60k, and which are not adjacent to each other, and between the grounding contacts 60d, 60i and the cover 30. The joining faces between the base 10 and the main portion 31 and first elongated portions 32 of the cover 30, and the joining face of the insulator 70 with the second elongated portion 33 of the cover 30 are recessed from their outer peripheries by a degree corresponding to the thickness of the cover 30, so that the outer faces of the main portion 31 and first elongated portions 32 of the cover 30 are flush with the outer face of the base 10 surrounding them, and the second elongated portion 33 of the cover 30 is flush with the outer face of the insulator 70 surrounding it.

The micro SD card 300 is attached to the thus assembled memory card adaptor 100 in the following manner. The micro SD card 300 in the normal insertion posture in which the longitudinal and front/back directions are oriented to the normal directions is inserted into the card housing space 14 through the card insertion port 2. The micro SD card 300 is inserted to an inner area of the card housing space 14 while the side portion where the locking cut-away 302 is disposed pushes back the card engagement portion 91 of the locking member 90 against the spring force. The eight contacts 303a to 303h which are disposed on the rear face of the rear end portion of the micro SD card 300 are contacted with the eight contact spring pieces 64a to 64h which are juxtaposed in the rear portion of the card housing space 14, to be electrically connected thereto. When the micro SD card 300 is further inserted into the card housing space 14, the rear end portion of the micro SD card 300 bumps against the front side face of the insulator 70 which rises in the rear end of the card housing space 14, thereby restricting further insertion. The card engagement portion 91 of the locking member 90 is opposed to the locking cut-away 302 of the micro SD card 300, and engaged with the locking cut-away 302 by the spring force, thereby preventing the micro SD card 300 from dropping off.

When the micro SD card 300 attached to the memory card adaptor 100 is to be extracted, the front-end portion of the micro SD card 300 is nipped, and the micro SD card 300 is forward extracted against the spring force of the locking member 90. Then, the engagement state between the locking cut-away 302 of the micro SD card 300 and the card engagement portion 91 of the locking member 90 is canceled, and the micro SD card 300 can be easily extracted from the memory card adaptor 100.

In the micro SD card 300 attached to the memory card adaptor 100, the eight contacts 303a to 303h are electrically connected to the corresponding eight contacts 60a to 60c, 60g to 60k. When the memory card adaptor 100 is attached to a card connector for the mini SD card 200, therefore, the eight contacts 303a to 303h of the micro SD card 300 are electrically connected to corresponding eight contacts of the card connector through the corresponding eight contacts 60a to 60c, 60g to 60k. In the same manner as the mini SD card 200, as a result, the micro SD card 300 is enabled to be used in the card connector for the mini SD card 200. Furthermore, electrical connection is established between the two grounding contacts 60d, 60i which are in the eleven contacts 60a to 60k, and which are not adjacent to each other, and between the grounding contacts 60d, 60i and the cover 30. Consequently, grounding contacts which may be a floating ground in the adaptor 100 can be eliminated from the adaptor, and the adaptor 100 can be provided with the electrostatic breakdown preventing function.

As described above, the connecting terminal 37 which is elastically displaceable is formed integrally on the conductive (metal-made) cover 30 that is one of components of the adaptor body 1, the connecting terminal 37 is contacted with the plural grounding contacts 60d, 60i, and electrical connection is established between the grounding contacts 60d, 60i, and between the grounding contacts 60d, 60i and the cover 30. Consequently, grounding contacts which may be a floating ground in the adaptor 100 can be eliminated, and the adaptor 100 can be provided with the electrostatic breakdown preventing function. Moreover, the connecting terminal 37 is contacted with the grounding contacts 60d, 60i by the elasticity of the terminal itself. Even when a dimensional error of components of the adaptor 100 or in assembly, or deformation due to an external force or heat which is applied to the adaptor 100 during use occurs, therefore, the connecting terminal can self-hold the contact with the grounding contacts 60d, 60i while absorbing the error or deformation, and high contact reliability can be ensured. Therefore, the electrostatic breakdown preventing function of the adaptor 100 can be surely maintained.

The first elongated portions 32 which are positioned on the outer side faces along the insertion/extraction directions of the adaptor body 1 are formed integrally with the cover 30. During use of the adaptor, even when the adaptor body 1 is nipped from any one of the vertical and lateral directions, therefore, the cover 30 of the adaptor body 1 is always nipped. Accordingly, the adaptor can be provided with the electrostatic breakdown preventing function irrespective of the nipped state of the adaptor body 1.

The second elongated portion 33 in which the end part is elongated to the position opposed to the portion where the plural contacts 60a to 60k are exposed from the adaptor body 1 is formed integrally with the cover 30, the folded piece 36 is formed integrally with the end part of the second elongated portion 33, and the connecting terminal 37 is formed integrally with the end part of the folded piece 36, and disposed on the inner face side of the second elongated portion 33. Therefore, the connecting terminal 37 is not protruded to the outside of the cover 30, and the possibility that the connecting terminal 37 is broken during a process of assembling the adaptor is reduced. The portion that allows the plural contacts 60a to 60k to be exposed from the adaptor body 1 is not opposed to an insulative (resin-made) cover in which the thickness cannot be much reduced, but to the second elongated portion 33 of the conductive (metal-made) cover 30 in which the thickness can be reduced. In the gap between the contacts and the second elongated portion, the connecting terminal 37 is placed via the folded piece 36, and hence the amount of elastic displacement of the connecting terminal 37 in the thickness direction of the adaptor can be increased. In accordance with this, also the elasticity (the contact pressure against the grounding contacts 60d, 60i) of the connecting terminal 37 can be increased, and therefore higher contact reliability of the connecting terminal 37 can be ensured. By partly stamping and raising the second elongated portion 33 of the cover 30, and without forming a hole in the second elongated portion 33, the connecting terminal 37 is disposed on the inner face side of the second elongated portion 33 via the folded piece 36 formed integrally with the end part of the second elongated portion 33. Therefore, the adaptor is effective also in the viewpoints of dustproof and waterproof.

The connecting terminal 37 is elongated from the end portion of the folded piece 36 in the direction of juxtaposition of the plural contacts 60a to 60k. Therefore, the width direction of the connecting terminal 37 corresponds to the length direction of the contacts 60a to 60k, and the width of the connecting terminal 37 can be made larger than that of the contacts 60a to 60k. Moreover, also the width of the folded piece 36 can be made larger than that of the contacts 60a to 60k. Consequently, the possibility that the connecting terminal 37 is broken during a process of assembling the adaptor can be further reduced. Since the width of the connecting terminal 37 can be made larger than that of the contacts 60a to 60k, a stable and sure contact property can be ensured in accordance with expansion of the contact area with the grounding contacts 60d, 60i. Accordingly, higher contact reliability of the connecting terminal 37 can be ensured.

The insulator 70 which holds the plural contacts 60a to 60k in the insulated state is sandwiched between the second elongated portion 33 and the base 10, and the folded piece 36 and the connecting terminal 37 are placed inside the housing hole 73 formed in the insulator 70. Consequently, the insulator 70 serves also as a spacer. Even when a compression load in the thickness direction is applied to the adaptor body 1 during use of adaptor, therefore, the folded piece 36 and the connecting terminal 37 are not crushed to be plastically deformed, and the function of the connecting terminal 37 can be surely maintained and exerted.

In the above embodiment, an example of the preferred embodiment of the invention has been described. The invention is not restricted to it, and may be variously modified without departing from the spirit of the invention. For example, the invention can be preferably applied also to memory card adaptors of other kinds except a memory card adaptor which enables the micro SD card 300 to be used in a card connector for an SD card.

What is claimed is:

1. A memory card adaptor which enables a small memory card to be used in a card connector for a large memory card that is larger than the small memory card, wherein said adaptor, comprises:
   a large memory card type adaptor body having outer dimensions to accommodate a large memory card, and to which a small memory card incorporating plural contacts is to be attached, said adaptor body having a conductive cover with a first elongated portion and a second elongated portion, and an insulative base;
   a connecting terminal which is elastically displaceable and formed integrally on said conductive cover;
   plural grounding contacts, wherein: and
   said connecting terminal is contacted with said plural grounding contacts to electrically connect said grounding contacts together, and said grounding contacts with said conductive cover;
   said second elongated portion in which an end part is elongated to a position opposed to a portion where said plural contacts are exposed from said adaptor body is formed integrally with said conductive cover;
   a folded piece is formed integrally with an end part of said second elongated portion, said connecting terminal is formed integrally with an end part of said folded piece, and disposed on an inner face side of said second elongated portion;
   an insulator which holds said plural grounding contacts in an insulated state is sandwiched between said second elongated portion and said insulative base; and
   said folded piece and said connecting terminal are placed inside a housing hole formed in said insulator.

2. The memory card adaptor according to claim 1, wherein:

said first elongated portion formed integrally with said cover is positioned on an outer side face of said adaptor body, extending along insertion/extraction directions of said adaptor body.

3. The memory card adaptor according to claim 1, wherein:

said connecting terminal is elongated from the end part of said folded piece in a direction of juxtaposition of said plural contacts.

* * * * *